Figure 1:
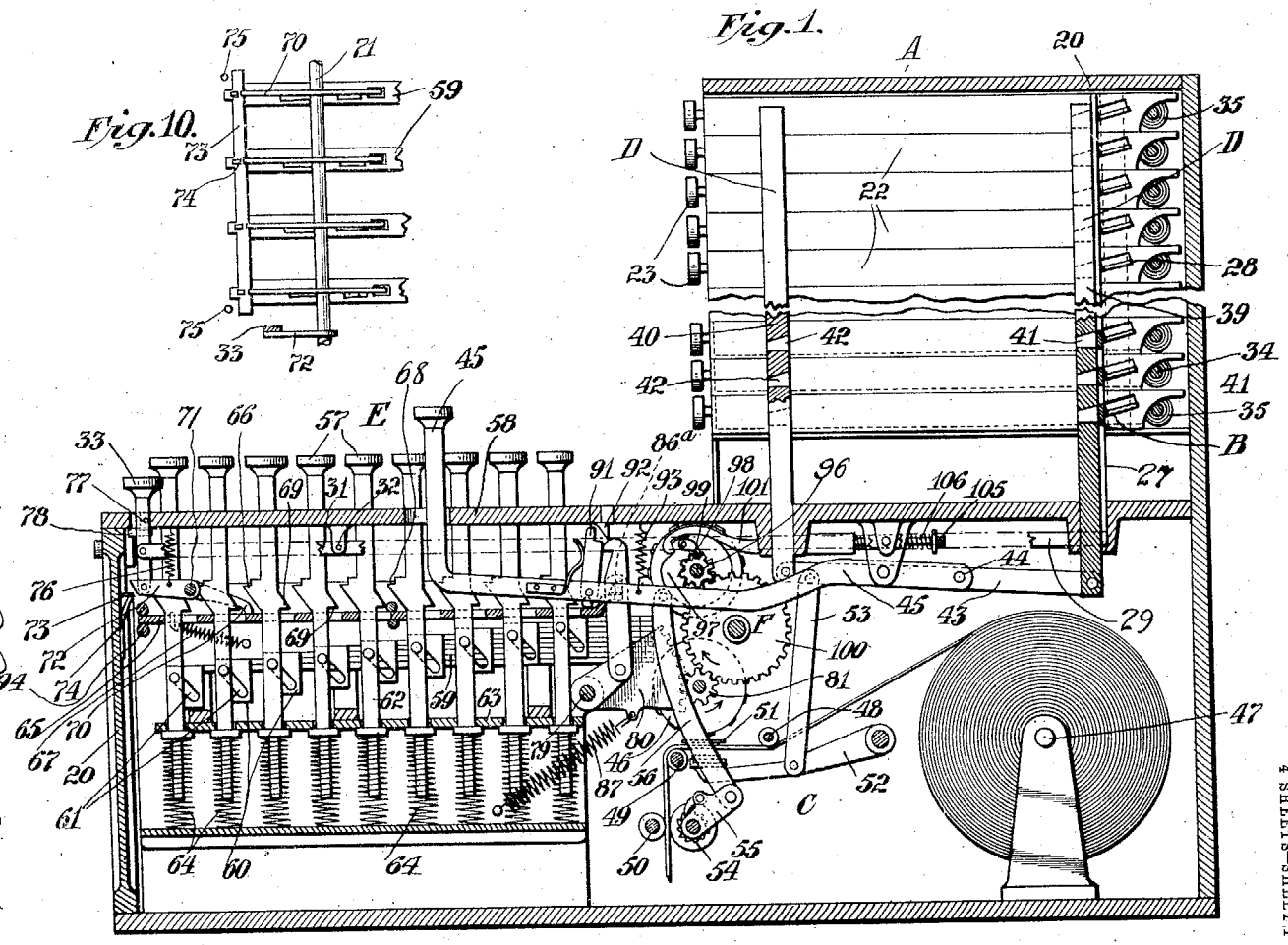

C. F. FOGG.

REGISTER.

APPLICATION FILED MAR. 30, 1910.

Reissued Oct. 7, 1913.

13,624.

4 SHEETS—SHEET 1

Attest:

C. S. Mitchell

P. O. Wenning

Inventor:

Charles F. Fogg by Frank P. Wentworth his Atty.

C. F. FOGG.

REGISTER.

APPLICATION FILED MAR. 30, 1910.

Reissued Oct. 7, 1913.

13,624.

4 SHEETS—SHEET 2.

Attest:

C. C. Mitchell

P. C. Wenning

Charles F. Fogg Inventor:

by Frank P. Wentworth his Atty

C. F. FOGG.
REGISTER.
APPLICATION FILED MAR. 30, 1910.
Reissued Oct. 7, 1913.
13,624.
4 SHEETS—SHEET 3.
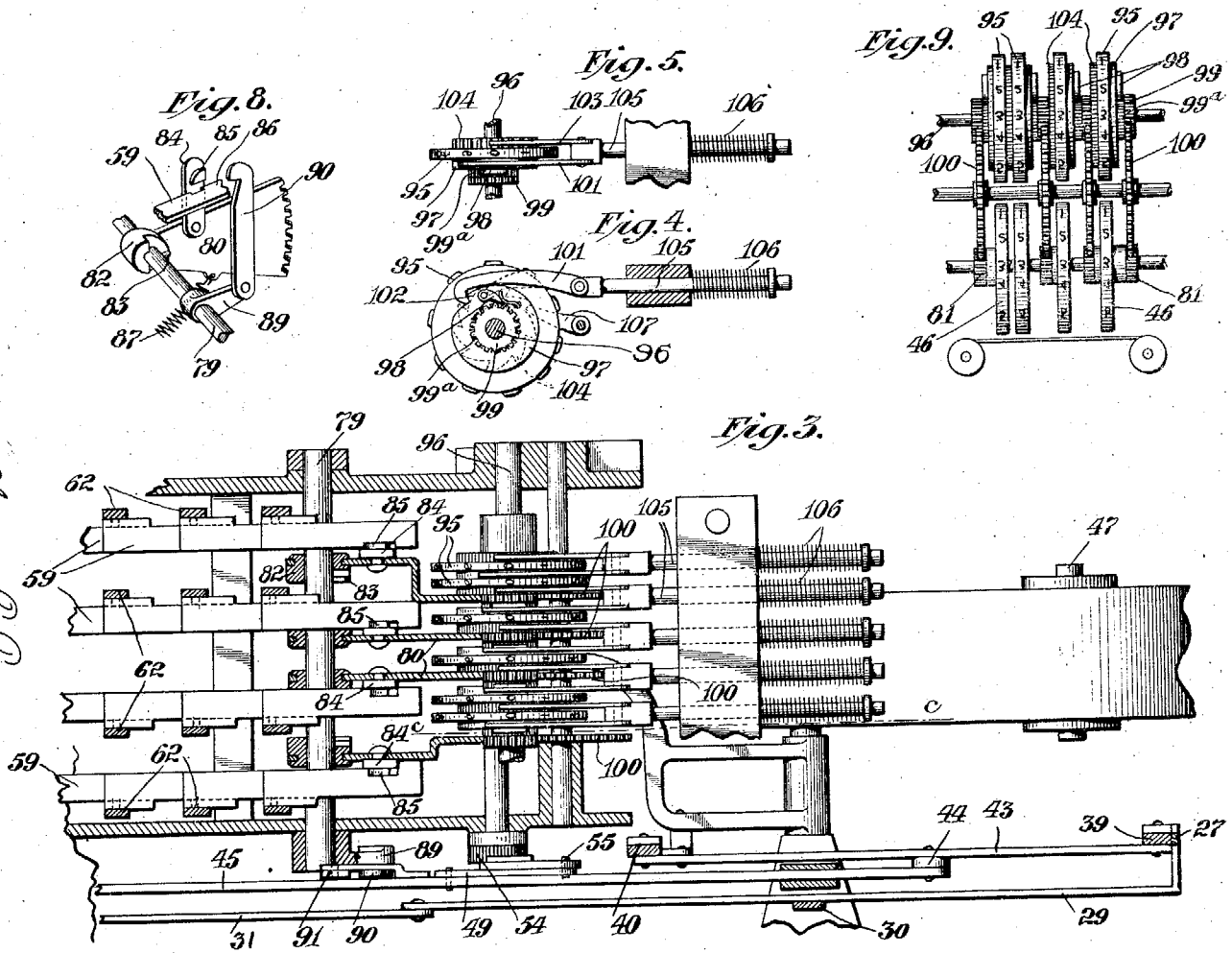
Attest:
E. S. Mitchell
P. A. Wenning
Charles F. Fogg Inventor:
by Frank P. Wentworth
his Atty.

C. F. FOGG.

REGISTER.

APPLICATION FILED MAR. 30, 1910.

Reissued Oct. 7, 1913.

13,624.

4 SHEETS—SHEET 4.

Attest:

E. D. Mitchell

P. O. Wening

Charles F. Fogg Inventor:

by Frank P. Wentworth his Atty.

UNITED STATES PATENT OFFICE.

CHARLES F. FOGG, OF NEW YORK, N. Y., ASSIGNOR, BY MESNE ASSIGNMENTS, TO AUTOMATIC BOOKKEEPING REGISTER COMPANY, A CORPORATION OF DELAWARE.

REGISTER.

13,624. Specification of Reissued Letters Patent. Reissued Oct. 7, 1913.

Original No. 883,306, dated March 31, 1908, Serial No. 365,101. Application for reissue filed March 30, 1910. Serial No. 552,473.

*To all whom it may concern:*

Be it known that I, CHARLES F. FOGG, a citizen of the United States, residing at the borough of Manhattan, in the city, county, and State of New York, have invented certain new and useful Improvements in Registers, of which the following is a specification, reference being had therein to the accompanying drawings, which form a part thereof.

My invention relates to registers and more particularly to a type thereof adapted for use in stores for the purpose of accurately recording various transactions.

My invention relates to a device differing from the ordinary cash register in the respect that it is not designed for use in accounting cash transactions, thus eliminating all of those characteristics essential to the cash register for safeguarding the purchaser as to change received, and the employer as to the amount of the transaction, by means of indicators. Furthermore, a plurality of series of digit keys are employed in a manner similar to the ordinary calculator or adding machine instead of denominational keys as in the ordinary cash register. The machine, however, differs from the ordinary calculator or adding machine in the absence of any recording totalizing adjuncts although preferably employing a total adder or register for determining the total transactions during any desired interval.

The machine further differs from the ordinary cash register in the respect that the various file drawers, or devices, are closed and locked with each transaction, one aim of the invention being to permit access to the file for the purpose of inserting charge slips prior to the recording of the transaction, but preventing such access after the transaction has been recorded to prevent tampering with charge slips.

The main object of the invention is to provide a machine embodying therein a plurality of filing devices adapted to receive and store autographic records of different transactions and a recording mechanism for making a permanent record of each transaction, wherein the construction and arrangement of the recording mechanism will be such as to so control the said filing devices as to permit free access thereto while the recording mechanism is set, while preventing such access after the actuation of the mechanism effecting the recording of each transaction.

A further object is to provide a machine of the character above referred to wherein the recording mechanism may be set by means of keys and the filing devices made accessible, or be unlocked, by means of an independent key prior to the making of the record of the transaction, the actuation of the mechanism effecting such record restoring the various setting devices to normal and automatically accomplishing the closing and locking of the filing devices.

A still further object is to provide a device of this character wherein the setting means will set the recording mechanism to indicate the sum of each transaction, control the filing devices and actuate the total adder in a manner to indicate the total amount of all transactions recorded.

A still further object is to provide in a register, filing devices adapted to be automatically closed and locked with the actuation of the recording mechanism; in conjunction with means for rendering the controlling mechanism for said filing devices inoperative at the will of the operator.

A still further object is to provide in a device of this character a file controlling mechanism adapted to be rendered inoperative at the will of the operator, wherein any file may be manually withdrawn from its case, and will be maintained in the open position until the actuation of the machine, in order to prevent access being had to the various files or any of them, without a record being made of the fact that some file had been opened.

A still further object is to provide in a device of this character filing devices of the character described, which will be so locked or retained within the file case as to prevent the complete removal thereof and thus prevent the withdrawal of any file during the actuation of the recording mechanism.

A still further object is to provide a printing mechanism embodying a plurality of type members in conjunction with an inking and an imprint mechanism whereby the said type members will be differentially movable to an extent defined by any one of a single series of depressible keys, all of which keys have a uniform movement.

A still further object is to provide an actuating mechanism wherein the total register will be actuated through the same agencies actuating the recording mechanism, suitable transferring devices being provided for carrying from one number wheel to the other in said registering mechanism, said register and said transferring device being inoperative during the restoration of parts to normal, to permit the accumulation upon said register of the total of all transactions recorded by the printing mechanism.

A still further object is to provide in a device of this character means controlling the filing devices which will prevent the actuation of the recording mechanism until the file controlling mechanisms have been actuated.

A still further object is to provide in a device of this character, means whereby only one digit key of each series may be depressed at a time which means will not in any way control or effect the digit keys in any other series. And a still further object is to provide an actuating mechanism which will be simple and compact in its arrangement of parts, will present no such complications as will permit the device to be gotten out of order or tampered with, and which will be capable of production at small cost.

My invention consists primarily in a register embodying therein in combination a filing device, a recording mechanism, means adapted to close and lock said filing device, upon the actuation of said recording mechanism, controlling means whereby said filing device may be unlocked and the closing means rendered inoperative, and main actuating means whereby said recording mechanism is actuated and said filing device is closed and locked, and in such other novel features of construction and combination of parts as are hereinafter set forth and described and more particularly pointed out in the claims hereto appended.

Figure 2:
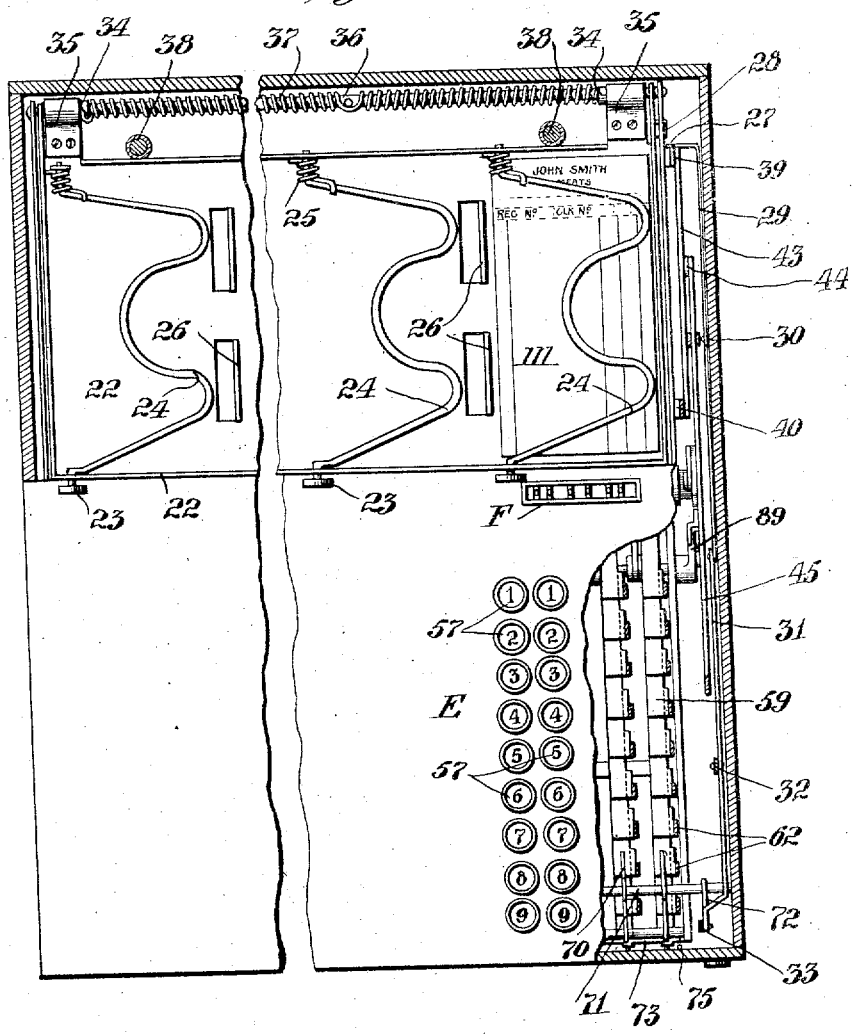
Figure 7:
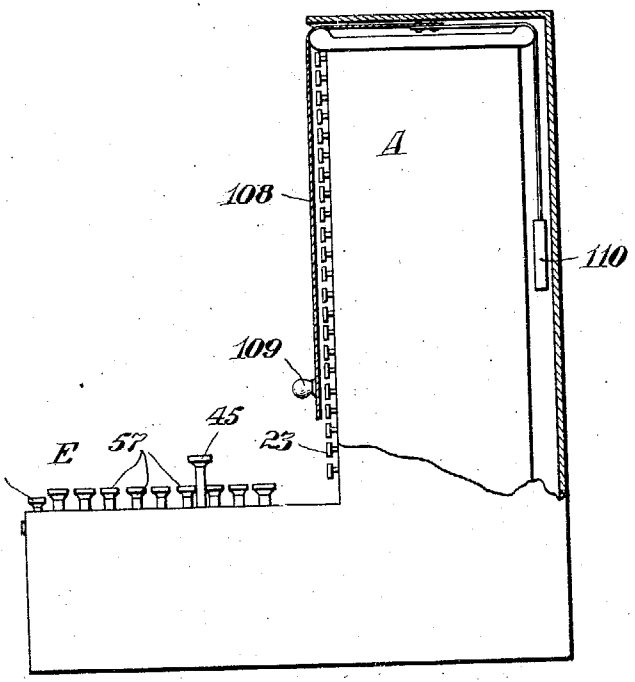
Figure 6:
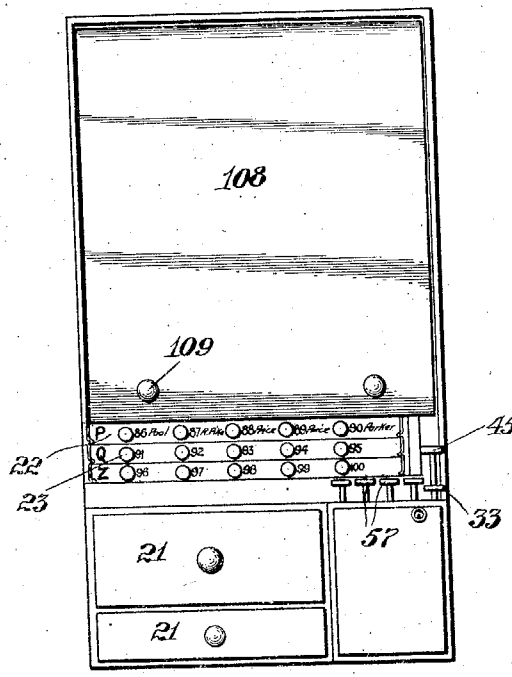

Referring to the drawings:—Figure 1 is a side elevation of the interior mechanism of my register, portions of the casing and supporting structures being shown in section; Fig. 2 is a plan view of the front portion of the register with one side partly broken away to disclose a plan view of the sliding plates for imparting a differential movement to the register and the printing mechanism; Fig. 3 is a horizontal sectional view; Fig. 4 is a vertical section on the lines C C of Fig. 3; Fig. 5 is a plan view of the details shown in Fig. 4; Fig. 6 is a front elevation of a register on a reduced scale, embodying therein a curtain structure for concealing the various file devices; Fig. 7 is a side elevation on the same scale; Fig. 8 is a perspective detailed view of an operative segment; Fig. 9 is an elevation of the printing and adding wheels looking from the right toward the left of the mechanism in the lower portion of the casing, as shown in Figs. 1 and 3; Fig. 10 is a plan view of the outer ends of the sliding plates controlling the differential movement of the register and the type wheels and the connecting parts.

Like reference numerals indicate like parts throughout the several views.

In the accompanying drawings I have shown a machine embodying my invention and in the following description will consider the various sub-combinations entering into the machine first in their broader aspects and then as to the detailed mechanism employed in the form of the invention shown.

The sub-combinations entering into the machine are broadly as follows:—

First. A filing device A, the function of which is to retain various charge slips made out at the time of each transaction. These filing devices are adapted to be normally closed and locked, so as to prevent access thereto except when the machine is actuated, said filing device being adapted to be released so as to cause the contents thereof to be readily accessible when the machine is set for operation; the actuation of the operating mechanism automatically closing and locking the filing devices when making the record of the transaction, the recording mechanism thus indicating whether or not the filing devices have been opened.

Second. Means B, exercising that control over the filing device resulting in the locking of the device when in the closed position and the restoration of such device to its closed position upon the actuation of the machine.

Third. A controlling mechanism D, for making the locking and closing devices inoperative prior to the actuation of the machine and to permit the filing device to be opened at the will of the operator, so that the charge slips may be filed, this means (in the form of the invention shown in the drawings) including devices adapted to hold the filing device in the open position until the main operating mechanism has been actuated.

Fourth. A recording mechanism, C, consisting of a paper strip support and strip feeding mechanism, type wheels or other type bearing devices, inking means and an imprint taking device such as an ordinary hammer under the control of the main operating mechanism so as to mechanically record each transaction indicated upon said type wheels or other printing device.

Fifth. A main actuating mechanism, E, which would include the computing keys for setting the printing mechanism and a mechanism exercising control over all of the other mechanisms for the purpose of either actuating same positively or restoring same to normal preparatory to the succeeding operation of the machine.

In addition to these sub-combinations there is included in the machine a registering device or total adder F, actuated simultaneously with the type wheels or other printing mechanism, the arrangement being such that with each actuation of the machine the printing devices are restored to normal, or zero, while the register or total adder is unaffected, thus causing the register to show the total of all transactions recorded.

Considered in its broader aspects, the invention contemplates a machine wherein a filing device is provided storing the individual autographic records of various transactions; wherein a record of the total of each transaction is mechanically recorded; wherein the actuation of the recording mechanism closes and locks the files to make the autographic record inaccessible, unless the machine is set for operation, means being provided whereby, the filing device may be opened at the will of the operator but cannot be closed except by the operation of the recording mechanism, thus making it absolutely essential that a mechanical record be made of some transaction each time the filing devices are opened.

The various mechanisms are all contained within a cabinet casing 20 which may be of any desired material. The computing and recording mechanism being preferably mounted in one side of the casing and the filing devices being mounted in a raised portion upon the opposite side thereof, so as to permit a multiplicity of such devices and the free operation thereof without interference with the other portion of the actuating mechanism. The space below the filing device I utilize for ordinary drawers 21 for storing charge slips, record sheets and other paraphernalia incidental to the use of the machine.

The filing device preferably consists of a plurality of superposed sliding drawers 22, each provided with a drawer pull 23, and with a plurality of spring clips 24 pivotally mounted in the front and rear walls of the drawer, said clips being automatically closed by a torsion spring 25 and encircling and secured to one end thereof and to the rear wall, the other end of said clips being attached to the drawer pull 23 so as to permit the clip to be raised through the rotation of said drawer pull. A plurality of such clips and partitions 26 may be used in each drawer to reduce the number of independent drawers used and the number of mechanism necessary for the actuation of the filing devices.

The front wall of each drawer is provided in any desired manner with alphabetical, numerical or account indices for facilitating the selection of the drawer containing any desired account in which a charge is being made. A locking means is provided common to all of the drawers constituting the filing device which preferably consists of a vertically sliding bar 27, mounted at one side of the cabinet, having alternate projections and notches adapted to coöperate with abutments 28 carried by the side of each drawer. The lock bar 27 is actuated by means of a lever 29 pivoted at 30, one end of which is so connected to the bar 27 as to impart the desired vertical movement thereto. The other end of the lever 29 is pivotally connected with a lever 31, pivoted at 32, which lever is under the control of the lock key 33.

Mounted in the cabinet 20 rearwardly of each drawer are drums 34, the opposite sides of each drawer being connected with one of said drums by a flexible strap 35, the springs of said drums being tensioned as the drawer is drawn outwardly so as to cause the drawers to be closed when the machine is operated in a manner to be more fully described hereinafter. Said drums are mounted on a spindle 36 and are actuated by a double torsion spring 37 secured centrally thereof to said spindle and having its opposite ends attached to said drums respectively. Suitable vertical stops 38 are provided to limit the rearward movement of said drawers although such are not absolutely essential to the operation of the machine. The drawers 22 being thus adapted to be automatically closed, I provide supplemental locking means whereby they will be held in the open position to make the closing means inoperative such means being actuated by the drawer as it is opened, but being under the control of the main actuating mechanism so that the supplemental locking means cannot be manipulated to permit the closing of a drawer until a record of some kind has been made. This supplemental locking means comprises two parallel sliding bars 39—40 arranged adjacent to the lock bar 28 toward the front of the cabinet, having a plurality of openings 41—42 extending therethrough, through which the abutments 28 are adapted to pass when the drawer is being opened or closed, said abutments engaging the imperforate portions of the bars 39 or 40 to lock it in either a partial or wholly open position. The abutments 28 are pitched downwardly and forwardly so as to automatically raise each bar 39 or 40 as it is opened, the said bars through gravity dropping back to the locking position when disengaged from said abutments. To facilitate this operation the surface of the bars 39—40 adapted to contact with the abutments is also pitched downwardly and forwardly as shown in the drawings. Releasing means for said supplemental bars 39—40 is provided consisting of a bar 43 having its opposite ends pivoted to said bars, and pivoted intermediate its ends at 44 to the main actuating lever 45, an arrangement which permits said bars 39—40 to be raised separately to permit the passage of the abutments 28 and simultaneously, to release the drawer and permit it to close under the spring 37. It will be observed that by this construction I provide drawers adapted to be normally closed and locked so as to have their contents inaccessible, which may be unlocked and opened at the will of the operator to permit access to the file, but which cannot be closed except through the actuation of the main actuating mechanism, which as will hereinafter appear, also controls the recording mechanism.

The recording mechanism comprises any desired form of type carrying members as the cylinders 46 bearing types on the periphery thereof. These cylinders are loosely mounted upon a shaft common to all such, and are adapted to be rotated independently by a different setting mechanism. The strip of paper is carried on a reel 47 and is led about guides 48 49 to the feeding rollers 50. An ordinary inking ribbon 51 is located between the strip and the type cylinder wheels and the imprint is made by means of a hammer 52 connected by a link 53 with the bar 43 so as to insure the making of the record before the lock bars 39 40 can be raised to permit a drawer 22 to close. The paper is fed by the rollers 50 by means of a ratchet wheel 54 carried by one of said rollers, an oscillating pawl and carrier 55 and a link connection 56 between said carrier and the main operating lever 45, the arrangement being such that the depression of said lever will move said pawl over said ratchet wheel, and the return of said lever, after the imprint has been taken, will cause said roller 50 to rotate, to advance the record strip preparatory to the next operation of the machine.

Each type wheel or cylinder 46 is set independently of the others by means of a separate mechanism controlled by a plurality of digit keys 57 which keys are arranged in parallel rows, those in each row or series representing the digits 1 to 9 only, the type wheels being set normally at zero. There are four rows of such keys indicating the units and tens in dollars and the units and tens in cents. The construction of each digit key is like that of every other and the arrangement of the mechanism appertinent to each row is like that of every other row. Hence only a detailed description of a single key and the mechanism for a single row of keys will be entered into.

Mounted below the top plate 58 of the machine and directly below each row of digit keys 57 are a plurality of sliding plates 59 nested so as to minimize the space required. These plates vary in length and each is under the control of its separate key 57 by means of a cam plate 60, on said sliding plate, having a cam slot 61 therein, and a coöperating pin entering said slot and carried by the stem 62 of said key. The lower part of each key stem 62 is mounted in a bearing plate 63 the end of said stem being extended as shown, so as to be retained in position. Each key is provided with a spring 64 which is tensioned by the depression of its key so as to tend to restore the key to normal. This spring also has the function of restoring its plates 59 to normal, through the cam plate 60 thereon. It will thus be observed that the keys 57 merely set the recording mechanism, other mechanisms being necessary to accomplish the actual making of the record.

To prevent the depression of more than a single key in a row with one actuation of the machine and to permit the operator to determine what number has been set, as well as to make the springs 64 inoperative until the recording mechanism has been actuated, I provide a lock plate 65 common to all keys in a row, which will hold any depressed key, in this position and prevent the depression of any other key in that row, means being provided whereby with the operation of the main actuating mechanism, all such lock plates will be actuated to release the keys held in the depressed position thereby and be restored to normal so as to permit the depression of any key in a series controlled by any such plate.

Each key stem 62 projects through an opening into its lock plate 65 and has formed thereon a cam 66 adapted to engage the forward edge of said opening and reciprocate said plate, which reciprocation has the twofold function of causing said plate to move forwardly so that it will be capable of a slight return movement under its spring 67 to accomplish the locking of the key by the engagement of a shoulder 68 above said cam surface with said plate; and to release that portion of the locking mechanism for its type wheel, with which each said lock plate coöperates in locking the said type wheel so as to make it inoperative except upon the depression of a key. Each key stem 62 is also provided with an abutment 69 on the side thereof opposite to the cam 66 the openings in the lock plate 65 being sufficiently long to permit the passage of said abutment, although after said plate has been actuated by a cam 62 all of said openings will be so positioned as to intercept the abutments on all other keys of the same series and prevent the depression thereof.

All of the lock plates 65 are normally locked against movement in either direction by a plurality of pawls 70 adapted to engage a recess in the plates 65. These pawls are all keyed to a rocking shaft 71 so that all of said plates may be simultaneously released or unlocked. This shaft 71 is rocked by means of a crank 72 to which the key 33 is pivotally connected, thus causing the depression of said key to simultaneously unlock the drawers and the key board.

Mounted forwardly of the pawls 70 is a spring controlled lock bar 73 supported and thrust toward said pawls, by a plurality of springs 74, the forward edges of said pawls being beveled as shown and adapted to oscillate and engage under said lock bar to cause said pawls to remain elevated after the depression of the key 33. Stops 75 are provided to limit the movement of the bar 73 and insure the engagement of the pawls therewith.

The springs 74 are arranged one opposite each lock plate 65 so that as any of said plates are reciprocated to release its type wheel locking mechanism, it will strike its spring and release its pawls 70 permitting said pawl to drop upon the key locking plate 65 so as to be in position to reëngage the recesses in said plates when they are ultimately restored to normal, the shaft 71 being rocked by the key 33 against the tension of, and restored to normal by, the spring 76.

Carried by the key 33 is a stud 77 adapted to be engaged by a pivotal lock member 78 having a controlling member exposed exteriorly of the machine. This member may be swung under the stud 77 by a suitable key, and by preventing the depression of this drawer releasing and key board controlling member, prevent the operation of the machine. If the proper degree of clearance be allowed in the pivotal connections between the stem of the key 33 and the lever 31, said stud may be inserted under the top plate 58 by rocking said key to lock the various parts controlled by said key in the open position.

Mounted upon a shaft 79 are a plurality of segmental racks 80 meshing with pinions 81 on its respective type or printing wheel. Each rack 80 is mounted on a hub 82 loosely mounted upon the shaft 79 and adapted to be engaged by a restoring means on the said shaft as the pins 83. Each rack 80 carries a pivoted link 84 carrying a stud 85 adapted to engage a lateral extension 86 on each of the sliding plates 59 and a similar extension 86[a] on its lock plate 65 which plate 59 limits or controls the quantity of movement of said racks and consequently the positioning of the numbers on the type wheels for printing.

The upper face of the stud 85 is beveled as shown so as to exert a camming action on its plate 65 to release the depressed key, and permit the projection 88 of said plate to pass under said stud, under the control of its spring 67 and lock the type wheel in its normal, or zero, position.

Each rack 80 is under the control of a spring 87, which actuates its racks to set its wheel.

Carried by the shaft 79 is a crank arm 89 to which is pivoted a hook 90, the nose of which hook is beveled as shown. There is but one such hook and its function is to restore all of the type wheels 46 to normal through its segmental rack after each actuation of the printing mechanism. The restoring means consists of a spring pressed pawl 91 pivoted to the main actuating lever 45 which is normally disengaged from the hook 90, but adapted to engage same upon the return movement of said lever. A fixed wedge 92 disengages said pawl and hook toward the end of the return movement of this lever, such disengaging means being necessary to prepare the machine for the next setting of the printing mechanism. The restoration of the lever 45 to normal is accomplished by means of the spring 93.

The sliding plates 59 are suitably supported within the cabinet 20, and the inner end of the lock or detent plate 65 is supported upon said plates 59, the forward end of said lock or detent plate being mounted between circular rods or rollers 94. (See Fig. 1.)

This register mechanism comprises a plurality of independently rotatable number wheels 95 mounted upon a shaft 96 common to all wheels, which wheels in number corresponding to the number of series of digit keys may be actuated independently of the carrying or transfer mechanism, in addition to their actuation by said mechanism.

Each number wheel has secured thereto a cam disk 97 carrying a pawl 98. Mounted on the shaft 96 is a pinion 99 carrying a ratchet wheel 99[a] adapted to be engaged by said pawl 98. The pinion 99 is entrained with the pinions 81 by any suitable gearing, as the idler gear 100 so that each number wheel is driven from and in unison with a type wheel of the same denomination, and hence advanced with each rotation of the type wheel while holding this advanced position (owing to the pawl and ratchet drive) when the type wheel is returned to normal, thus accumulating the various amounts recorded. The independent actuation of keys in different series, however, makes it necessary as described, to permit all number wheels entrained with type wheels, to be rotated independently while providing transfer mechanisms for carrying the total represented by the complete rotation of a wheel of one denomination to the wheel of the next higher denomination, except when two keys are simultaneously depressed.

The transfer mechanism comprises a reciprocating hook 101 adapted to engage the shoulder 102 of the cam plate 97 and a pawl 103 adapted to engage a ratchet wheel 104 carried by the wheel of next higher denomination. Said hook and pawl are pivotally mounted on a reciprocating rod 105 mounted in suitable bearings which rod has a retracting spring 106 against the tension of which the rod is advanced through the movement of the hook 101, with the cam plate 97. This construction causes both the hook and pawl to act in unison, and thus accomplishes a one tenth revolution of the wheel of higher denomination with each full rotation of the wheel of lower denomination. The cam plate 97 accomplishes, automatically, the disengagement of the hook and the shoulder on the cam plate after the desired quantity of feeding movement of the wheel of higher denomination. I also provide a holding pawl 107 for preventing a return movement of any number wheel with the return of any of its operating mechanisms to normal.

In order to conceal the names of parties running accounts a flexible curtain 108 may be provided as shown in Figs. 6 and 7. This curtain carries operating knobs 109 and has attached thereto a counterweight 110, said curtain and counterweight cords passing over the top of the tier of drawers.

The operation of the herein described register is substantially as follows:—When a charge transaction is completed, an autographic record thereof is made in duplicate, upon an ordinary charge slip bearing the account name or number or both. One such slip as the original indicated at 111 is for the store record while the other serves as a confirmation of the order for delivery separately or with the purchaser. This gives the customer a perfect check upon the merchant and vice versa as the two sets of records must agree. Loss to the merchant can therefore, result only from tampering with his records, and it is to obviate this difficulty that this machine is designed. The clerk having completed the charge slip he proceeds to record the transaction upon the machine in the following manner, assuming that the lock 78 has been released:—The key 33 is first depressed, its downward movement oscillating the levers 29—31 to draw the lock bar 27 downwardly so as to permit any drawer 22 to be partially withdrawn from the cabinet. This downward movement of the key 33 simultaneously rocks the shaft 71, thus raising all of the pawls 70 and permitting the lock plates 65 to be reciprocated by any of the keys 57. The beveled ends of the pawls 70 in their descent engage and oscillate the lock bar 73, the springs 74, when said pawls have passed said bar, forcing said bar over said pawls to hold them elevated. The amount of the transaction, is then indicated by the depression of the proper digit key in each series, the operation of each key depressed in each series being the same with respect to its controlled mechanism. As each key is depressed, its stem is guided by the top plate 58, the opening through the lock plate 65 and the bearing plate 63, and the cam 66 on said stem engaging the forward edge of said opening, slides said plate forwardly and simultaneously the plate 59 is moved forwardly through its cam plate 60 and the pin on said stem engaging the slot 61 a definite distance the movement of the former disengaging the extension 86ª from the stud 85 and permitting the link 84 and its segment 80 to descend under its spring 87 for a distance determined by the extension 86 on the slide plate 59 actuated. The rack 80 in its descent turns its type wheel 46 so as to bring the figure corresponding with that of the depressed key into the printing position. As the segment 80 descends its hub 82, through its engagement with the pin 83 rocks the shaft 79 and its crank 89, and thus draws the hook 90 downwardly. If the second key depressed represents a larger or a smaller figure, the movement of the hook 90 will either be greater, or there will be no movement thereof at all. As the lock plate 65 is forced forwardly by the arm 66, it will, with the passage of the cam, return and engage the shoulder above said cam, holding the key in the depressed position. As the position of the plate 65 will at this interval be such as to cause the abutment 69 of any other key in the series to engage it, if it be attempted to depress any other key in that series. As this plate 65 is reciprocated by any cam 66 it engages its spring 74 and oscillates the bar 73 in a manner to permit the pawl 70 to drop upon the slide 65 preparatory to its reengagement with the recess in said plate when the various parts are restored to normal, said plates through said cam, holding the lock bar 27 in its inoperative position. When all of the proper keys are depressed, the desired file drawer 22 is pulled outwardly, the bands 35 tensioning the spring 37 so as to exert a tendency to close the drawer. As the drawer is opened, the abutments 28 pass through the notches or openings therethrough, and through the openings 41—42 in the bars 39—40, consecutively raising these bars and permitting them to drop back into a position preventing the closing of the drawer by the spring 37. As each printing wheel 46 is rotated, it advances its counting or number wheel 95 in the total adder or register, in the same degree as it is itself moved, thus increasing the total appearing upon said register by the number represented by the key depressed, such movement being by means of the entrained gears 81, 98 and 100, and the pawl and ratchet connection between the gear 98 and its number wheel. If the number already registered on any wheel and the number added thereto shall amount to more than nine, the transfer mechanism will carry to the next wheel by a one-tenth revolution of said wheel. In carrying the shoulder 102 on the cam plate 97 engages the hook or latch member 101 as the number 9 approaches the sight opening, and the next one-tenth revolution of the wheel of lower denomination, causes a similar movement in the number wheel of next higher denomination through the rod 105, the pawl 103 and the ratchet wheel 104 on said last mentioned number wheel. After this movement has been completed, the cam 97 disengages the hook 101 from the shoulder 102 permitting the return of these parts to their former positions preparatory to the next carrying operation, the pawl 107 preventing a return movement of the number wheel. The charge slip is then placed in its proper file—and the recording mechanism having been set with relation to that one transaction, and the amount having been added to the total adder or register, the main actuating mechanism is operated to record the transaction and restore the several parts to normal. As the lever 45 is oscillated by the depression of its key, it raises both supplemental locking bars 39—40 through the connecting bar 43 permitting the drawer 22 in which the charge slip 108 has been filed, to be closed by the spring 37, the upward movement of the bar 43 through the link 53 causing the hammer 52 to strike the record paper and secure an imprint from the type wheels 46 by means of the inking ribbon 51. The downward movement of the lever also carries the pawl 91 downwardly where its spring will force it into engagement with the hook 90 upon the reversal of the direction of movement of said lever; and sets the pawl carrying lever 57 relative to the ratchet wheel 54 preparatory to the feed of the record strip. When the key of the main actuating lever 45 is released, its spring 93 raises it to its normal position and through the upward movement, all of the operative parts of the machine excepting the register, or total adder, are restored or permitted to return to normal. The upward movement of the pawl 91 carries with it the hook 90, turning or rocking the shaft 79 in a manner to cause each of the pins 83 thereon to turn the hubs 82 thus rotating or oscillating the various segmental racks 80 to restore the printing or type wheels to their normal or zero position. As each segment 80 is raised, the link 84 carried thereby is also raised, causing the upper cam-like surface on its abutment or stop 85 to engage the extension 86ᵃ on its plate 65 forcing said plate forwardly until the depressed key 57 in that series is released permitting its spring 64 to raise it and through the cam plate 60 restore the sliding stop plate 59 to normal. This movement permits the lock plate 65 to be moved rearwardly by its spring 67 simultaneously thrusting the extension 86ᵃ under the abutment 85, and permitting the pawl to drop into its recess, thus again locking said series of keys and the printing mechanism controlled thereby. As the pawls 70 drop into their respective recesses, the key 33 is raised by the spring 76 rocking the levers 29—31 to restore the lock bar 27 to its locking position, and preventing access to the contents of any file drawer until the release mechanism has been again set. Both supplemental lock bars 39—40 are also restored to normal through the return movement of the bar 43 by the lever 45. The upward movement of the lever 45 also oscillates the lever 55, feeding the record strip forward by means of the rollers 50, after the record has been made and preparatory to the next actuation of the machine. When the lever 45 approaches the limit of its upward movement, the wedge 92 disengages the pawl 91 and the hook 90.

The register or total adder accumulates the various sums recorded and is not affected in any way by the restoration of parts to normal.

It will thus be observed that the various filing devices are normally locked; that they may be released at the will of the operator, but that when once opened, they cannot be closed except through that operation of the machine resulting in the mechanical recording of some amount or transaction. It will also be observed that when any mechanism has been set, whether to release the drawer, or the lock or detent plate for the key levers, or to set the printing members, it must remain set until a record of some kind has been made and that the mechanism making this record restores all actuated parts to normal.

Considered broadly, it is not my intention to limit the invention to the details of the operating mechanism, such being capable of variation while preserving all of the broad essentials of the machine.

I believe it to be broadly new to provide in a register, a filing device which, while normally locked, may be released and opened at the will of the operator; but when once opened cannot be closed except through agencies making a record of the fact that the machine has been operated, and I intend to claim such broadly.

Having described the invention, what I claim as new, and desire to have protected by Letters Patent, is:—

1. In a register the combination of a filing device comprising a plurality of independently movable members adapted to be severally opened or closed, a recording mechanism, means adapted to close and lock any of said movable members which may be open upon the actuation of said recording mechanism, controlling means whereby said locking means may be rendered inoperative as to all members of said filing device, and main actuating means whereby said recording mechanism is actuated and any of said filing devices are closed and locked.

2. In a register, the combination of a filing device comprising a plurality of independently movable members, means normally locking all members of said device in the closed position, a recording mechanism, controlling means whereby the locking device may be rendered inoperative to permit the opening of any member of said filing device, main actuating means, whereby said recording mechanism is actuated, and said controlling means is restored to normal, and means under the control of said main actuating mechanism whereby any member of said filing device is held open until said mechanism is operated and is closed by the operation of said main actuating mechanism.

3. In a register, the combination of a filing device comprising a plurality of independently moving members, means normally locking all members of said device in the closed position, a recording mechanism, a clerk's key adapted to release the locking means for said device to permit any member of said device to be opened, main actuating means whereby said recording mechanism is actuated and said key and said locking means are restored to normal, and means under the control of said main actuating mechanism whereby said device is held open until said mechanism is operated, and is caused to close by the operation of said actuating mechanism.

4. In a register, the combination of a filing device comprising a plurality of independent sliding drawers, means common to all of said drawers normally locking same in the closed position, a recording mechanism, controlling means whereby said locking device may be rendered inoperative to permit the opening of any of said drawers, main actuating means whereby said recording mechanism is actuated and said controlling means is restored to normal, and means under the control of said actuating mechanism whereby any drawer opened, is held open until said mechanism is operated, and is closed by the operation of said mechanism.

5. In a register, the combination of a filing device comprising a plurality of superposed independent sliding drawers, an abutment on each of said drawers, a vertically sliding plate adapted to normally engage the abutments on all of said drawers simultaneously, and to be simultaneously disengaged from all of said abutments to permit the withdrawal of any drawer, means actuating said plate to cause such disengagement, a recording mechanism, main actuating means whereby said recording mechanism is actuated, whereby said first mentioned means is restored to normal to relock said drawers, and means under the control of said actuating mechanism whereby any drawer opened is held open until said mechanism is operated, and is closed by the operation of said mechanism.

6. In a register, the combination of a filing device comprising a plurality of superposed independent sliding drawers, an abutment on each of said drawers, a vertically sliding plate adapted to normally engage the abutments on all of said drawers simultaneously, and to be simultaneously disengaged from all of said abutments to permit the withdrawal of any drawer, means actuating said plate to cause such disengagement, a spring drum mechanism connected by straps to each said drawer whereby said drawer is adapted to be automatically closed, a recording mechanism, main actuating means whereby said recording mechanism is actuated whereby said first mentioned means is restored to normal to relock said drawers, and supplemental locking means adapted to be actuated by said mechanism whereby any drawer opened is held opened against the tension of its spring until said mechanism is operated, and said supplemental locking means are actuated to permit said springs to close said drawer by the actuation of said mechanism.

7. In a register, the combination of a filing device comprising a plurality of superposed independent sliding drawers, an abutment on each of said drawers, a vertically sliding plate adapted to normally engage the abutments on all of said drawers simultaneously, and to be simultaneously disengaged from all of said abutments to permit the withdrawal of any drawer, means actuating said plate to cause such disengagement, a spring drum mechanism connected by straps to each said drawer whereby said drawer is adapted to be automatically closed, a recording mechanism, main actuating means whereby said recording mechanism is actuated whereby said first mentioned means is restored to normal to relock said drawers, and supplemental locking means consisting of vertically moving lock bars having a plurality of cam surfaces therein adapted to be engaged by the abutments on the drawers to permit said drawers to be opened and cause said bars to drop behind said abutments to lock the drawers in the open position, a cross bar connecting said bars and connected to the main actuating mechanism whereby any drawer opened is held open until said mechanism is operated and is permitted to close under its spring when said mechanism is operated, to make a record.

8. In a register the combination of a filing device comprising a plurality of superposed independent sliding drawers, an abutment on each drawer, a vertically sliding plate adapted to normally engage the abutments on all of said drawers simultaneously, and to be simultaneously disengaged from all of said abutments to permit the withdrawal of any drawer, means actuating said plate to cause such disengagement, spring controlled means whereby said drawers may be automatically closed, a recording mechanism including type members, means setting same, inking means and a hammer, supplemental locking means consisting of vertically moving lock bars having a plurality of cam surfaces therein adapted to be engaged by the abutments on the drawers to permit said drawers to be opened and cause said bars to drop behind said abutments to lock the drawers in the open position, and a cross bar connecting said bars, a main operating lever pivotally connected to said cross bar, and a link connection between said cross bar and said hammer whereby any drawer opened is held open by said supplemental lock bars until said lever is operated, and is permitted to close under its spring simultaneously with the actuation of said hammer.

9. In a register, the combination of a plurality of independently movable normally closed and locked filing devices, a recording mechanism, a clerk's key whereby all said filing devices may be simultaneously unlocked, means actuated by said key whereby said recording mechanism will be locked against movement until said key has been operated to unlock said devices, means whereby any filing device opened will be held open until the recording mechanism has been actuated, means adapted to close any opened filing device with the actuation of said recording mechanism, and main actuating means whereby any opened recording mechanism is actuated and said filing device is closed and all said filing devices are locked.

10. In a register, the combination of a filing device comprising a plurality of superposed, independent, sliding drawers, a lock member carried by each drawer, a recording mechanism, means adapted to close each drawer upon the actuation of the recording mechanism, locking means common to all said drawers and adapted to normally engage the lock member on each drawer, a clerk's key and connecting levers whereby said drawers may all be simultaneously unlocked, means setting said recording mechanism, connections between said clerk's key and said setting means whereby said means are locked against movement until said drawers have been unlocked, means whereby any drawer opened is held in the open position until the recording mechanism has been actuated and main actuating means whereby said recording mechanism is actuated, and said mechanism, said drawers, said locking means and said clerk's keys are all restored to normal.

11. In a register, the combination of a filing device comprising a plurality of superposed, independent, sliding drawers, a lock member carried by each drawer, a recording mechanism, means adapted to close each drawer upon the actuation of the recording mechanism, locking means common to all said drawers and adapted to normally engage the lock member on each drawer, a clerk's key and connecting levers whereby said drawers may all be simultaneously unlocked, means holding said clerk's key and said unlocking means in their operative position until the recording mechanism has been actuated, means setting said recording mechanism, connections between said clerk's key and said setting means whereby said means are locked against movement until said drawers have been unlocked, means whereby any drawer opened is held in the open position until the recording mechanism has been actuated and main actuating means whereby said recording mechanism is actuated, and said mechanism, said drawers, said locking means and said clerk's keys are all restored to normal.

12. In a register, the combination of a filing device comprising a plurality of superposed, independent, sliding drawers, a lock member carried by each drawer, a recording mechanism, means adapted to close each drawer upon the actuation of the recording mechanism, locking means common to all said drawers and adapted to normally engage the lock member on each drawer, a clerk's key and connecting levers whereby said drawers may all be simultaneously unlocked, means holding said clerk's key and said unlocking means in their operative position until the recording mechanism has been actuated, means setting said recording mechanism, connections between said clerk's key and said setting means whereby said means are locked against movement until said drawers have been unlocked, means whereby any drawer opened is held in the open position until the recording mechanism has been actuated, main actuating means whereby said recording mechanism is actuated, and said mechanism, said drawers, said locking means and said clerk's keys are all restored to normal, and a lock whereby said clerk's key may be held against movement to prevent the operation of the machine.

13. In a register the combination of a filing device comprising a plurality of independently movable members adapted to be severally opened, a recording mechanism, means adapted to close and lock any of said movable members which may be open upon the actuation of said recording mechanism, controlling means whereby said last named means may be rendered inoperative, a total adder actuated in unison with and by the same mechanism setting said recording mechanism, and main actuating means whereby said recording mechanism is actuated and said first named locking means is actuated to close and lock any open movable member of the filing device.

14. An account register in which is comprised a series of drawers for containing credit bills; a series of digit keys; a series of printing wheels; a series of total adding wheels; means for moving the printing wheels and total adding wheels in unison, means for restoring the printing wheels to normal after an imprint has been taken therefrom, means normally locking all said drawers, actuating means coöperating with said last named means whereby all of said drawers may be simultaneously unlocked, means acting on each of said drawers, whereby they are adapted to close automatically, and main actuating means adapted to make an impression from said printing wheels and cause the printing wheels, the digit keys and the drawers to return to their normal position.

15. In a register, the combination of a filing device comprising a plurality of independently movable members, means normally locking all members of said device in the closed position, a recording mechanism, controlling means whereby the locking device may be rendered inoperative to permit the opening of any member of said filing device, a total adder actuated in unison with, and by the same mechanism actuating, said recording mechanism, main actuating means, whereby said recording mechanism is actuated, and said controlling means is restored to normal, and means under the control of said main actuating mechanism whereby any opened member of said filing device is held open until said mechanism is operated and is closed by the operation of said main actuating mechanism.

16. In a register, the combination of a plurality of independently movable normally closed and locked filing devices, a recording mechanism and main actuating means, with means whereby any of said filing devices may be unlocked to be opened manually, means whereby when once unlocked, any of said filing devices which is open is maintained in this condition until the actuation of the recording mechanism by the main actuating means, and means controlled by said main actuating means whereby any opened member of said device is closed and all said members are locked.

17. In a register, the combination of a filing device, comprising a plurality of independently movable members, means normally locking all members of said device in the closed position, a recording mechanism, a clerk's key adapted to release the locking means for said device to permit any member of said device to be opened, a total adder actuated in unison with, and by the same mechanism actuating, said recording mechanism, main actuating means whereby said recording mechanism is actuated and said key and said locking means are restored to normal, and means under the control of said main actuating mechanism whereby any opened member of said device is held open until said mechanism is operated, and is caused to close by the operation of said actuating mechanism.

18. In a register, the combination of a filing device comprising a plurality of independent sliding drawers, means common to all of said drawers normally locking same in the closed position, a recording mechanism, controlling means whereby said locking device may be rendered inoperative to permit the opening of any of said drawers, a total adder actuated in unison with, and by the same mechanism actuating, said recording mechanism, main actuating means whereby said recording mechanism is actuated and said controlling means is restored to normal, and means under the control of said actuating mechanism whereby any drawer opened, is held open until said mechanism is operated, and is closed by the operation of said mechanism.

19. In a register, the combination of a plurality of independently movable normally closed and locked filing devices, a recording mechanism, a clerk's key whereby said filing devices may be unlocked, means actuated by said key whereby said recording mechanism will be locked against movement until said key has been operated to unlock said devices, means whereby any filing device opened will be held open until the recording mechanism has been actuated, means adapted to close any opened filing device with the actuation of said recording mechanism, a total adder actuated in unison with, and by the same mechanism actuating, said recording mechanism, and main actuating means whereby said recording mechanism is actuated and any opened filing device is closed and all said devices are locked.

20. In a register, the combination of a filing device comprising a plurality of superposed, independent, sliding drawers, a lock member carried by each drawer, a recording mechanism, means adapted to close each drawer upon the actuation of the recording mechanism, locking means common to all said drawers and adapted to normally engage the lock member on each drawer, a clerk's key and connecting levers whereby said drawers may all be simultaneously unlocked, means setting said recording mechanism, connections between said clerk's key and said setting means whereby said means are locked against movement until said drawers have been unlocked, means whereby any drawer opened, is held in the open position until the recording mechanism has been actuated, a total adder actuated in unison with, and by the same mechanism setting, said recording mechanism, and main actuating means whereby said recording mechanism is actuated, and said mechanism, said drawers, said locking means and said clerk's keys are all restored to normal.

21. In a register, the combination of a filing device comprising a plurality of superposed, independent, sliding drawers, a lock member carried by each drawer, a recording mechanism, means adapted to close each drawer upon the actuation of the recording mechanism, locking means common to all said drawers and adapted to normally engage the lock member on each drawer, a clerk's key and connecting levers whereby said drawers may all be simultaneously unlocked, means holding said clerk's key and said unlocking means in their operative position until the recording mechanism has been actuated, means setting said recording mechanism, connections between said clerk's key and said setting means whereby said means are locked against movement until said drawers have been unlocked, means whereby any drawer opened is held in the open position until the recording mechanism has been actuated, a total adder actuated in unison with, and by the same mechanism setting, said recording mechanism, and main actuating means whereby said recording mechanism is actuated, and said mechanism, said drawers, said locking means and said clerk's keys are all restored to normal.

22. In a register, the combination of a filing device comprising a plurality of superposed, independent, sliding drawers, a lock member carried by each drawer, a recording mechanism, means adapted to close each drawer upon the actuation of the recording mechanism, locking means common to all said drawers and adapted to normally engage the lock member on each drawer, a clerk's key and connecting levers whereby said drawers may all be simultaneously unlocked, means holding said clerk's key and said locking means in the operative position until the recording mechanism has been actuated, means setting said recording mechanism, connections between said clerk's key and said setting means whereby said means are locked against movement until said drawers have been unlocked, means whereby any drawer opened is held in the open position until the recording mechanism, has been actuated, a total adder actuated in unison with, and by the same mechanism, setting said recording mechanism, main actuating means whereby said recording mechanism is actuated, and said mechanism, said drawers, said locking means and said clerk's keys are all restored to normal, and a lock whereby said clerk's key may be held against movement to prevent the operation of the machine.

23. In a register, the combination with printing wheels, of a plurality of segmental gears actuating same, means controlling the quantity of movement of said gears comprising a plurality of series of digit keys, a plurality of sliding plates, a cam plate having a cam slot therein, inclosing a pin on its digit key, a restoring spring acting on each key, whereby the key restores said sliding plate to normal, means carried by said segment adapted to engage any sliding plate moved from normal, and main actuating means adapted to secure an imprint from said wheels and restore all said parts to normal.

24. In an account register, a series of digit keys; a series of printing wheels; a series of total adding wheels; and means for moving the printing wheels and adding wheels in unison, in combination with a series of drawers each provided with a closing spring and with means for holding it in an open position, and a single key adapted to actuate the printing mechanism, adding mechanism, and release the drawer holding mechanism.

25. In an account register, a series of digit keys; a series of independent, horizontally movable bars superposed one above the other and arranged to be moved by said keys, each of said bars having an abutment near its inner end, in combination with a segmental gear, a vertically movable bar carried by the segment, and independent means for moving said segment in opposite directions.

26. In an account register, a series of digit keys; a series of independent, horizontally movable bars, superposed one above the other and arranged to be moved by said keys, each of said bars having an abutment near its inner end, in combination with a segmental gear, a vertically movable bar carried by the segment and printing wheels adapted to be rotated by said segment.

27. In an account register, a series of rows of digit keys; a series of rows of independent, horizontally movable bars superposed one above the other, each of said bars having an abutment near its inner extremity, in combination with a series of segmental gears, each of said gears being provided with a vertically movable bar; a series of printing wheels arranged to be moved by the segmental gears, and a series of total adding wheels arranged substantially as shown and described.

28. In an account register, the combination with a key, and a horizontally movable bar connected to said key, of a segmental gear carried by a slotted hub loosely mounted on a shaft; a carrying shaft; a slotted hub; a pin projecting from said shaft into the slot of the hub; means for drawing the toothed segment downward, and means for partially rotating said shaft.

29. In an account register, a segmental gear carried by a slotted hub loosely mounted on a shaft; a carrying shaft; a slotted hub a pin projecting from said shaft into the slot of the hub; means for drawing the segmental gear downward and means for partially rotating said shaft.

30. In an account register, a segmental gear carried by a slotted hub loosely mounted on a shaft; a carrying shaft; a slotted hub a pin projecting from said shaft into the slot of the hub; means for drawing the segmental gear downward; means for variably limiting its downward movement and means for returning the segment to its initial position.

31. In an account register, a vertically movable digit key; a horizontally movable stop-plate adapted to be actuated by said key; a perforated locking-plate through which the key-bars passes, and a segmental gear the downward movement whereof is controlled and regulated by the stop-plate and the locking-plate.

32. In an account register, a segmental gear carried by a slotted hub loosely mounted on a shaft; a carrying shaft; a slotted hub; a spring for pulling said gear downward, and means for limiting the downward movement of said segmental gear, in combination with a master key-lever provided with means for raising the segmental gear to its initial position when depressed.

33. In an account register, a shaft provided with a pin, a slotted hub loosely mounted on the shaft, a segmental gear carried by said hub, a crank attached to said shaft, a hook carried thereby, a master key-lever and a pawl pivoted in the same arranged to engage the hook and be released therefrom when the master key-lever is raised.

34. In an account register, the combination with a segmental gear bearing a link provided with an abutment the link and the abutment of a horizontally moving plate having a cam plate, and a digit key-bar connected therewith and controlling the movement of the movable plate and segmental gear.

35. In an account register, the combination with a series of digit key-bars, each provided with a beveled projection and step at one edge and a beveled projection on the opposite edge, of a slotted locking-plate through which each key-bar passes; means for controlling the movements of the locking-plate; printing wheels, and independent, horizontally movable bars connected to the key-bars and adapted to control the printing wheels.

36. In an account register, a perforated locking-plate; digit key-bars passing through the perforations in the locking plate; a pawl arranged to engage a slot in the locking-plate; means for releasing said pawl, and means for locking said pawl against any movement.

37. In an account register, locking-plates provided with slots therein; a series of pawls mounted on a shaft over said locking-plates; a series of connected actuating springs at the rear of the locking-plates, and means for holding the pawls out of engagement with the slots, and for causing them to automatically engage therewith.

38. In an account register, the combination with a series of keys and key-plates, and a series of credit-bill drawers, of a series of locking-plates provided with slots therein; a series of pawls mounted on a shaft over said locking-plates; a series of connected actuating springs at the rear of the locking plates, and means for holding said pawls out of engagement with the slots, and for causing them to automatically engage therewith.

39. In an account register, a series of drawers for holding credit-bills; springs for automatically returning said drawers to a closed position after being opened; slotted bars adapted to hold a drawer against closing when opened, recording mechanism, and a master key-lever connected to said slotted bars and to the recording mechanism.

40. In an account register, a series of rows of independent digit keys; independent, superposed, horizontally movable plates, each controlled by one of said keys; a locking-plate provided with a projection at its inner extremity, and a segmental gear adapted to be released from engaging said projection by the depression of any key in a row.

41. In an account register, the combination with the digit keys, the horizontally movable bars controlled thereby, and the locking-plate therefor, of a segmental rack bearing a link having thereon an abutment arranged to pass through a slot in the edge of a key-plate, or engage with said plate, substantially as shown and described.

42. In an account register, a row of digit keys and a digit key plate; means for locking all the other keys in a row against movement when one of the keys has been depressed, and a segmental gear the movements whereof are controlled by the locking means, and limited by the digit key-plate.

In witness whereof, I have hereunto affixed my signature this 29th day of March in the presence of two witnesses.

CHARLES F. FOGG.

Witnesses:
F. O. WENTWORTH,
P. FRANK SONNEK.